United States Patent [19]

Rody

[11] Patent Number: 5,445,360
[45] Date of Patent: Aug. 29, 1995

[54] THERMOSETTING ELASTOMERIC HOSE HAVING AN INTERNAL SOCKET FORMED THEREIN

[75] Inventor: H. Steven Rody, McBain, Mich.

[73] Assignee: Cadillac Rubber & Plastics, Inc., Cadillac, Mich.

[21] Appl. No.: 134,047

[22] Filed: Oct. 12, 1993

[51] Int. Cl.⁶ .............................................. F16K 51/00
[52] U.S. Cl. .................................... 251/148; 285/319; 285/921
[58] Field of Search ................ 285/921, 319; 251/148, 251/142

[56] References Cited

U.S. PATENT DOCUMENTS

| | | | |
|---|---|---|---|
| 1,043,683 | 11/1912 | Fieser . | |
| 2,103,838 | 12/1937 | Bach | 285/71 |
| 2,366,814 | 1/1945 | Smith | 285/71 |
| 2,874,981 | 2/1959 | Brady | 285/238 |
| 3,194,705 | 7/1965 | Caplan | 264/506 |
| 3,207,833 | 9/1965 | D'Errico | 264/278 |
| 3,603,621 | 9/1971 | Parsons | 285/319 |
| 3,667,785 | 5/1970 | Kapeker | 285/231 |
| 3,727,949 | 4/1973 | Kleykamp et al. | 285/7 |
| 4,091,063 | 5/1978 | Logan | 264/94 |
| 4,099,744 | 7/1978 | Kutnyak et al. | 285/921 |
| 4,289,726 | 9/1981 | Potoczky | 264/318 |
| 4,310,184 | 1/1982 | Campbell | 285/328 |
| 4,330,017 | 5/1982 | Satoh et al. | 138/126 |
| 4,435,352 | 3/1984 | Olsen et al. | 264/504 |
| 4,629,220 | 12/1986 | Crusco | 285/328 |
| 4,660,803 | 4/1987 | Johnson et al. | 285/921 |
| 4,777,004 | 10/1988 | Galer | 264/320 |
| 4,972,875 | 11/1990 | Beer et al. | 137/590 |
| 5,104,157 | 4/1992 | Bahner | 285/921 |
| 5,139,289 | 8/1992 | Koss | 285/921 |
| 5,267,757 | 12/1993 | Dal Palù | 285/921 |
| 5,284,318 | 2/1994 | Geiger et al. | 285/921 |

FOREIGN PATENT DOCUMENTS

WO9102919 3/1991 WIPO ................. 285/921

*Primary Examiner*—A. Michael Chambers
*Attorney, Agent, or Firm*—Varnum, Riddering, Schmidt & Howlett

[57] ABSTRACT

The invention relates to the method and apparatus for producing a cured elastomeric hose having an internal socket or other internal configuration formed therein. The invention also relates to the product produced according to the method and the apparatus. Cured elastomeric hose can be formed having an internal socket by mounting the hose on a mandrel assembly having the desired internal configuration formed therein. An end forming cap assembly is selectively mounted on the hose and mandrel assembly, tightly engages the hose and forces the hose to assume the shape of the mandrel assembly. The hose is cured and then the end forming cap is removed from the hose through the use of an air removal tool. The product produced according to this invention is suitable to receive a wide variety of articles such as an anti-splashback valve or a molded thermoplastic connector.

8 Claims, 10 Drawing Sheets

THERMOSETTING ELASTOMERIC HOSE HAVING AN INTERNAL SOCKET FORMED THEREIN

BACKGROUND OF THE INVENTION

1. Field of the Invention

This invention relates to themosetting elastomeric hoses and, more particularly, to a cured, reinforced rubber hose having an internal socket formed therein, the socket being adapted to support a connector, a valve, or the like.

2. Description of the Related Art

Reinforced thermosetting rubber hoses are used as conduits in innumerable applications. The cured, reinforced material provides excellent resistance to corrosion, temperature and the environment. One of several applications for such hoses is in the automotive industry. A length of hose can be cured into a desired shape and used as a fluid conduit to fuel from the fuel fill inlet to the fuel tank in an automobile.

Another problem inherent in the use of cured, reinforced rubber hoses is the ability to securely connect two hoses to one another in tandem. One solution is to utilize a sleeve-like connector and secure the ends of the hose to the connector by a retaining mechanism such as a hose clamp. Alternatively, a more complicated mechanical connector such as that in U.S. Pat. No. 3,603,621 issued Sep. 7, 1971 to Parsons can be used. Once again, these connections suffer from the same problems as described above. Namely, the increased weight and/or cost of the retaining mechanism.

SUMMARY OF THE INVENTION

The rubber hose, according to the invention overcomes the problems of the prior art by creating an internal socket or other configuration on the interior surface of a length of cured, elastomeric hose. The interior surface can be adapted to receive a connector, a valve or the like.

The invention comprises a cured thermosetting rubber hose having a contoured internal surface. The hose comprises a first end, a second end and a body portion disposed between the ends. The body has a first diameter. A socket portion is formed within the length of the body portion wherein the socket portion has a second diameter, the second diameter being greater than the first diameter. A pair of external ramped surfaces are formed on the exterior surface of the hose and extend between the first and second ends of the socket portion and the body portion. A pair of internal ramped locking surfaces are formed on the interior surface of the hose and extend between the interior surface of the socket portion to the interior surface of the body portion. The pair of internal ramped locking surfaces are adapted to engage a member and selectively support the member in the cured elastomeric hose.

In a preferred embodiment, the elastomeric hose comprises a thermosetting rubber hose and the member supported in the hose comprises an anti-splashback valve.

In another embodiment, at least one of the internal ramped locking surfaces comprises an annular locking flange having a leading ramped conical surface and a radial, outwardly extended locking edge. The locking edge is adapted to be received in a complementary groove of the member supported in the socket. Preferably, the member supported in the socket comprises a connection member which is adapted to connect two ends of two elastomeric hoses to one another, in tandem.

BRIEF DESCRIPTION OF THE DRAWINGS

The invention will now be described with reference to the drawings in which.

DETAILED DESCRIPTION OF THE PREFERRED EMBODIMENTS

Figure 1:
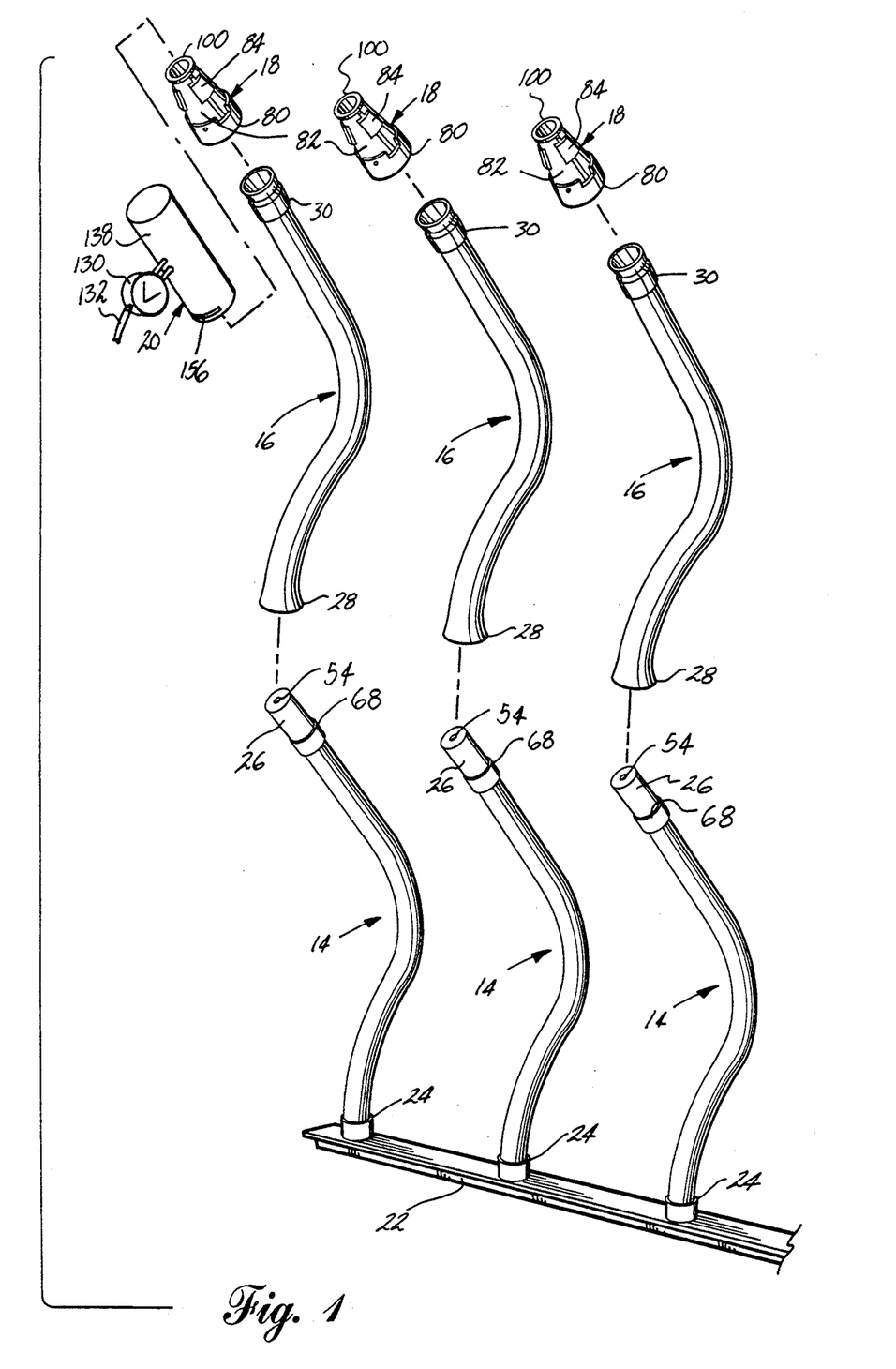
FIG. 1 is an exploded view of the apparatus for use in forming an internal socket in a cured rubber hose according to the invention.

Referring now to the drawings and to FIG. 1 in particular, the apparatus for forming a length of cured, reinforced elastomeric hose with an internal socket is shown. Preferably, the hose comprises a reinforced synthetic thermosetting rubber. However, any thermosetting elastomeric material can be used according to the invention.

The apparatus for forming an internal socket comprises a mandrel assembly 14, an end cap forming assembly 18 and an air removal tool 20. Preferably, a plurality of mandrel assemblies 14 are mounted to a rack 22 for mass production of reinforced rubber hoses according to the invention. Lengths 16 of uncured reinforced rubber hose are selectively received on the mandrel assemblies 14 and are cured according to the invention with sockets formed therein.

A lower end 24 of the mandrel assembly 14 is securely mounted to the rack 22. A socket forming end 26 of the mandrel assembly 14, opposite the lower end 24, is provided on an upper end of such mandrel assembly 14. As noted above, a length of reinforced rubber hose 16 is selectively mounted on the mandrel assembly 14 so that it extends from the lower end 24 to the outer end of the socket forming end 26. A lower end 28 of the hose 16 is adjacent the lower end 24 of the mandrel assembly 14 when the hose 16 is fully received on the mandrel assembly 14. In this position, an upper end 30 of the hose 16 is received on the socket forming end 26 of the mandrel assembly 14. As will be described further below, the end cap forming assembly 18 is selectively received on the upper end 30 of the hose 16 and the socket forming end 26 of the mandrel assembly 14 to create the contoured, internal surface of the cured rubber hose according to the invention. After the hose has been cured, the air removal tool 20 is used to extract the end forming cap assembly 18 from the upper end 30 of the hose and the cured rubber hose 16 from the socket forming end 26 of the mandrel assembly 14.

Figure 2:
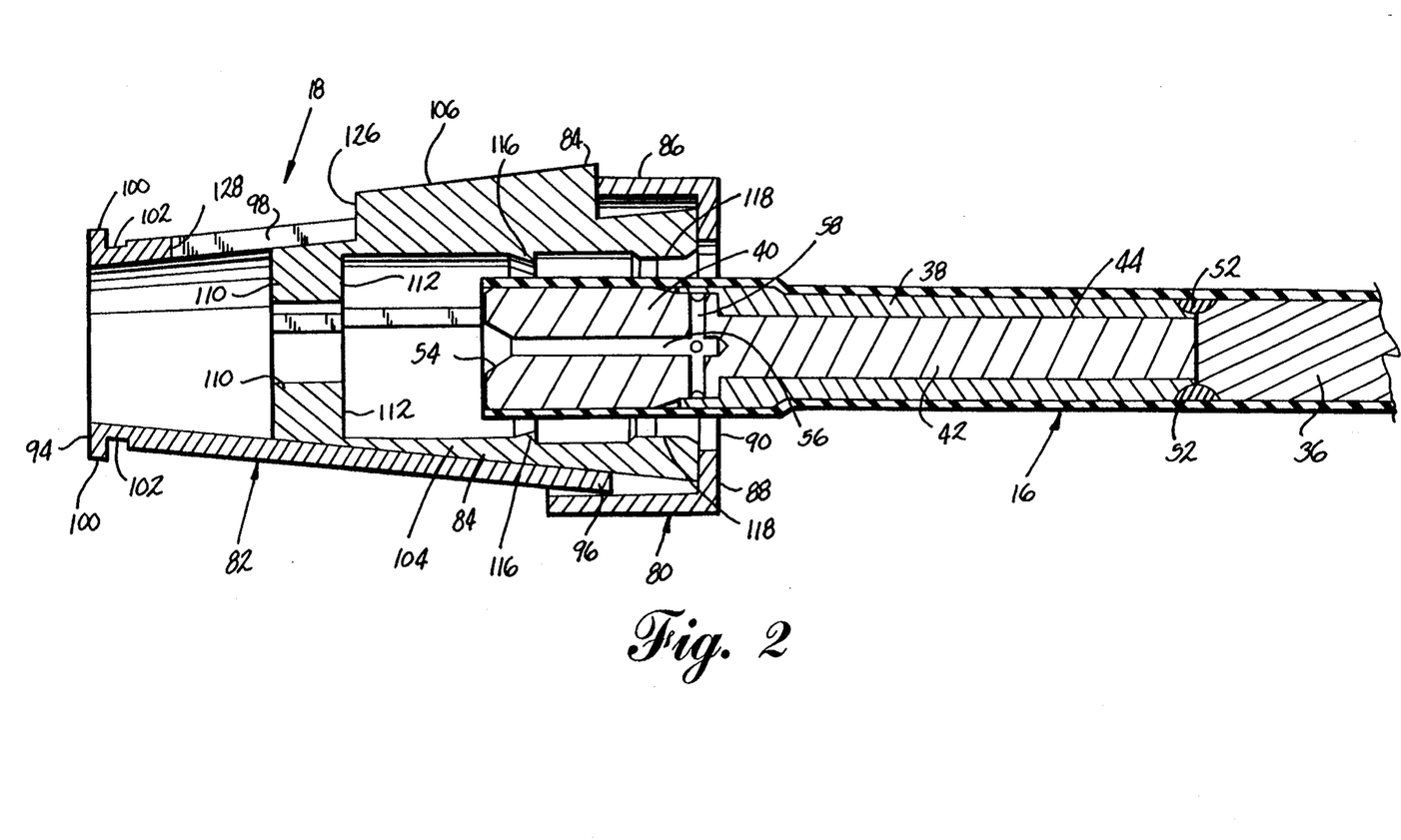
FIG. 2 is a sectional view of an end forming cap assembly and a socket forming end of the mandrel with an uncured rubber hose in place as the end forming cap assembly is initially received on the mandrel.
Figure 6:
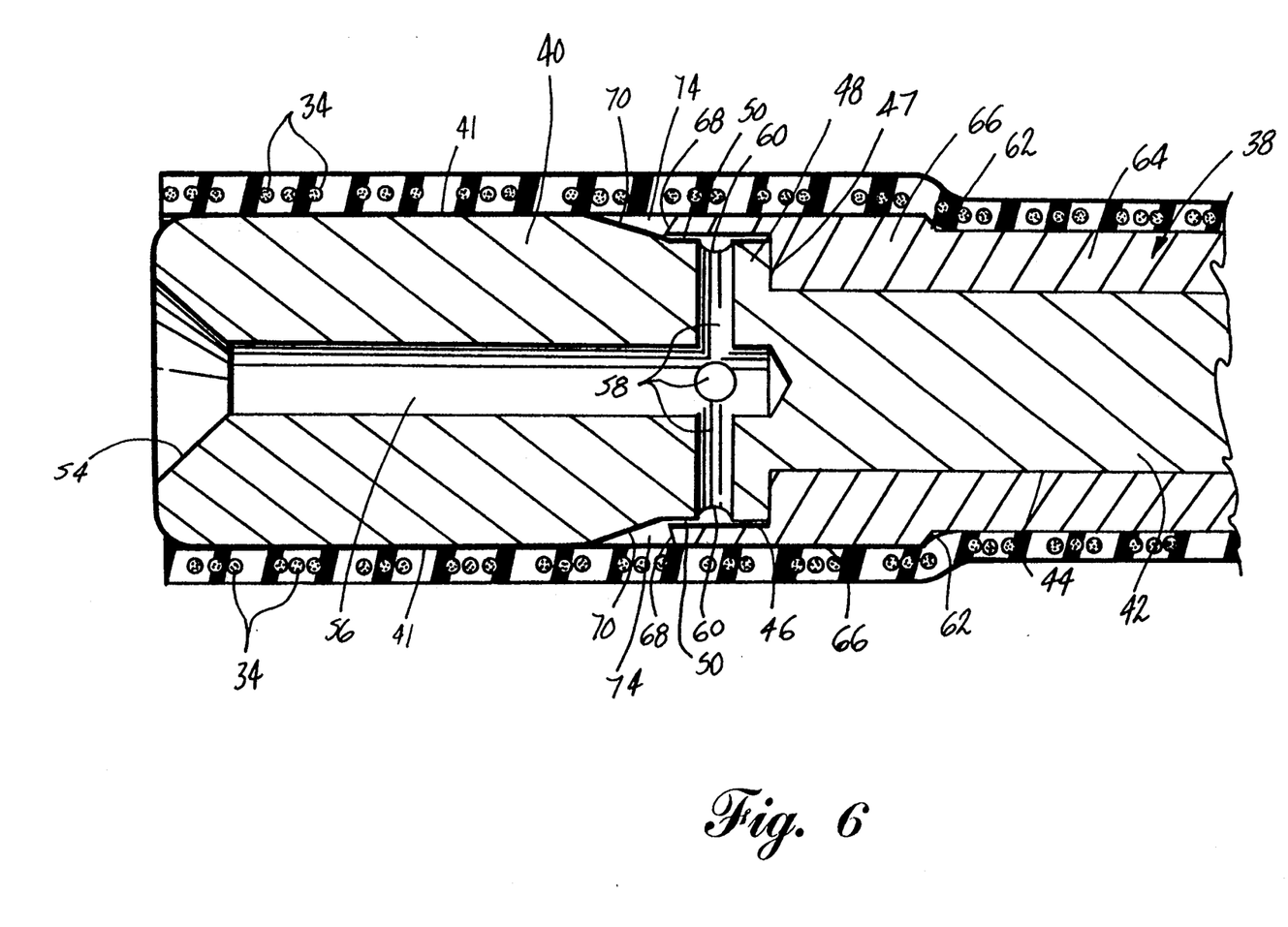
FIG. 6 is an enlarged partial sectional view of the socket forming end of the mandrel having a length of uncured rubber hose mounted thereon.

FIG. 2 is a sectional view of the end forming cap assembly 18 and the socket forming end portion of the mandrel assembly 14 as the end forming cap assembly 18 is initially mounted on the end of the hose 16. The mandrel assembly 14 comprises a lower member 36, a sleeve member 38 and an end forming member 40 which are securely connected as an integral unit. The lower member 36 is connected to the sleeve member 38 through an annular weld 52. As seen in FIG. 6, the end forming member 40 has a cylindrical body portion 42 which is press fit into a first bore 44 of the sleeve member 38. The sleeve member 38 further has a second bore 46 of larger diameter than the first bore 44 and forming a shoulder 47 therebetween. The second bore 46 is adapted to receive a shoulder portion 48 of the end forming member 40. The shoulder portion 48 of the end forming mandrel 40 has a diameter sufficiently smaller than the second bore 46 such that a small air space 50 is formed between exterior surface of shoulder portion 48 and the interior surface of the second bore 46. The terminal end 68 of the sleeve 38 has a slightly beveled surface.

As further shown in FIG. 6, the diameter of the shoulder portion 48 of the end forming mandrel 40 is less than the diameter of an outer surface 41 of the end forming mandrel 40. A sloped annular surface 70 extends between the shoulder portion 48 and the outer surface 41 of the end forming mandrel 40. The terminal end of the end forming member 40 has a conical recess 54 formed therein and an axial passageway 56 which extends from the conical recess 54 through the body 49 to the shoulder portion 48 of the end forming member 40. A plurality of radial passageways 58 are formed in the shoulder portion 48 of the end forming member 40 and extend from the axial passageway 56 to a annular groove 60 formed on the outside surface of the shoulder portion 48. The axial passageway 56, radial passageway 58 and annular groove 60 serve as a fluid conduit to supply pressurized air to the exterior surface of the end forming member 40 to assist in the removal of the cured hose 16 from the mandrel assembly 14.

The sleeve member 38 comprises a tubular-shaped body 64 having a first external diameter and a socket forming portion 66 having a second external diameter, greater than the first. An annular sloped surface 62 extends from the body 64 to the socket forming portion 66. The terminal end 68 of the socket forming portion 66 is spaced from the sloped annular surface 70 of the end forming member 40 to define therebetween an annular recess 74 which is in open communication with the axial passageway 56 through the radial passageway 58 and the annular air space 50.

The hose preferably comprises a reinforced thermosetting synthetic rubber material. The reinforcing material 34 (FIG. 6) can comprise any conventional reinforcing material such as steel, nylon or Kevlar.

Figure 7:
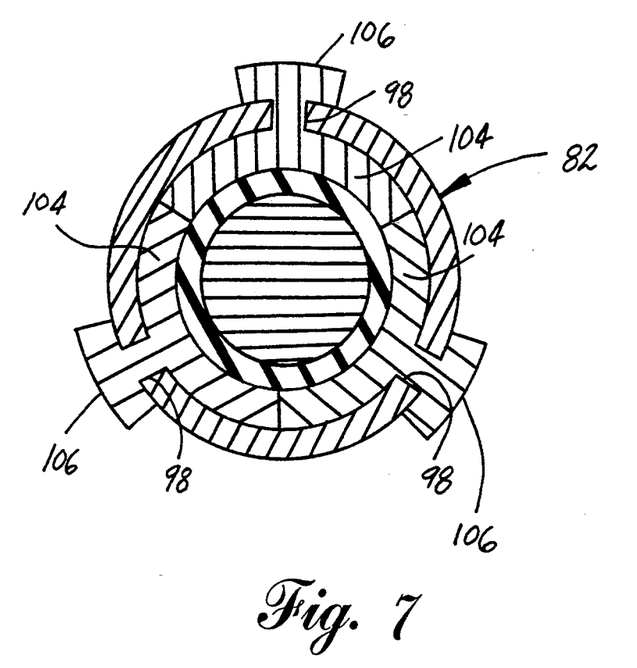
FIG. 7 is a sectional view of the end forming cap assembly taken along lines 7—7 of FIG. 3.

As seen in FIGS. 2 and 7, the end forming cap assembly 18 comprises a cylindrical retaining cap 80 securely mounted to the widest end 96 of a tapered cone 82 and a plurality of sleeve members 84 slidably mounted in the cone 82. The retaining cap 80 comprises a tubular-shaped body 86 and a inward radially extending end flange 88 formed on one end of the tubular body 86. A circular aperture 90 of the retaining cap 80 is defined by the end flange 88. Sleeve member slots 92 (FIG. 3) are formed in the end of the body tubular-shaped 86 opposite the end flange 88. As described further below, the sleeve member slots 92 are adapted to receive at least a portion of the sleeve members 84 when the sleeves are in the open position illustrated in FIG. 2.

The tapered cone 82 comprises a narrow end 94 and a wide end 96. The narrow end 94 of the tapered cone comprises an end flange 100 and a groove 102 immediately adjacent the narrow end 94. A plurality of sleeve member channels 98 are formed in the body of the tapered cone 82 and extend from the wide end 96 of the cone to a point a spaced distance from the narrow end 94. The sleeve members 84 comprise a cylindrical body portion 104 and T-shaped fins 106 which extend radially outwardly from the body portion 104 and are received in the sleeve member channels 98 of the tapered cone 82.

In the preferred embodiment, the tapered cone 82 has three sleeve member channels 98 formed therein and three sleeve members 84 slidably mounted for axial movement in the tapered cone 82. As seen in FIG. 7, the channels are spaced approximately 120 degrees from each other and T-shaped fins 106 of the sleeve members are also 120 degrees apart. The sleeve members 84 move radially toward and away from the central axis of the cone 82 as the sleeves move from the wide end 96 to the narrow end 94 of the cone 82 due to the tapered inner surface of the cone 82 and the tapered outer surface of the sleeve members 84.

Each of the sleeve members 84 also includes an inwardly extending stop flange 110 having a rear surface 112. The interior surface 114 of the sleeve members 84 has a first annular projection a prescribed distance from the stop flange 110 and a second annular projection 118 a second prescribed distance from the stop flange. The projections 116, 118 cooperate with the socket forming portion 66 of the mandrel assembly 14 to create the desired internal configuration of the hose 16.

Figure 11:
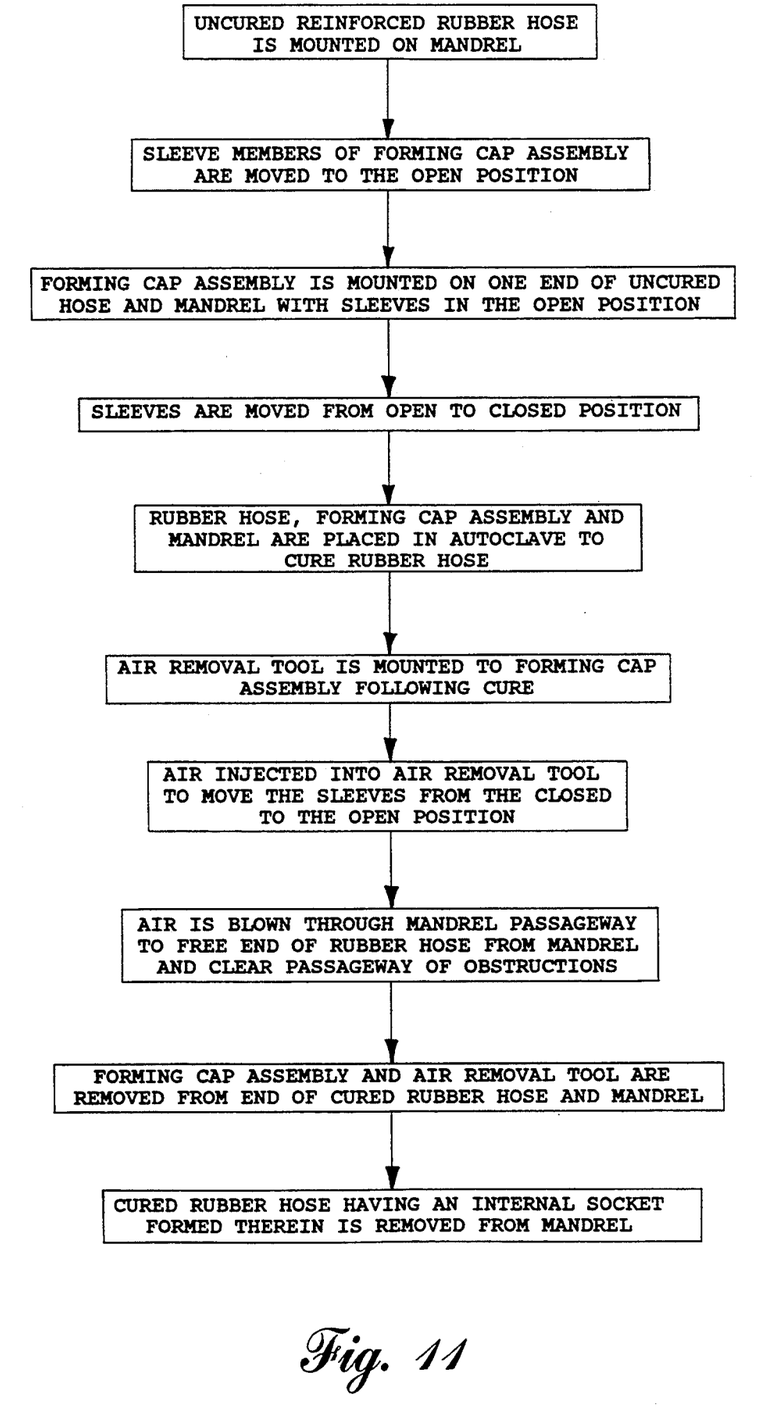
FIG. 11 is a flow chart of the process of forming an internal socket in a cured, reinforced rubber hose according to the invention.

The process of forming an internal socket on a length of rubber hose will now be described with reference to FIGS. 2–5 and the flow chart describing the basic steps of the process shown in FIG. 11. The process begins by mounting a length of uncured, reinforced rubber hose 16 on the mandrel assembly 14. The hose 16 is fully received on the mandrel assembly 14 when the upper end 30 of the hose 16 telescopically surrounds the socket forming end 26 of the mandrel assembly 14. Any air which may have been trapped between the interior surface of the hose 16 and the mandrel assembly 14 can be vented through the annular recess 74, annular groove 60, radial passageway 58 and axial passageway 56. The removal of any entrapped air from the upper end 30 of the hose 16 is important to avoid defects in the formation of the internal socket in the cured rubber hose product.

After the hose 16 is mounted on the mandrel assembly 14, the end cap forming assembly 18 is telescopically mounted on the upper end 30 of the hose 16 and the socket forming end 26 of the mandrel assembly 14. Prior to mounting the end forming cap 18 on the upper end 30 of the hose 16, the sleeve members 84 are positioned in the open position, namely adjacent the wide end 96 of the tapered cone 82 as illustrated in FIG. 2. The end forming member 40 of the mandrel assembly 14 is received in the aperture 90 of the retaining cap 80 and into the space defined by the three sleeve members 84. As the end cap forming assembly 18 is received on the end forming member 40, the end forming member 40 will eventually engage the rear surface 112 of the stop flange 110 of each sleeve member 84. Continued insertion of the end forming member 40 relative to the cap 18 causes the sleeve members 84 to slide in the sleeve member channels 98 from the wide end 96 toward the narrow end 94 of the tapered cone 82 as a result of the engagement of the end forming member 40 and the stop flange. The movement of the sleeves from the wide end 96 to the narrow end 94 of the cone results in inward radial movement of the sleeve members 84 on the upper end 30 of the hose 16. Eventually, the leading edge 126 of the sleeve members 84 will abut the terminal end 128 of the sleeve member channel 98. In this positions, as seen in FIG. 3, the sleeve members 84 are in the closed position.

In the closed position, the sleeve members 84 tightly engage the uncured rubber hose 16 such that the first annular projection 116 of the sleeve members 84 forces a portion of the uncured hose into the annular recess 74 defined by the annular shaped surface 70 of the end forming member 40 and the terminal end 68 of the sleeve member 38. Similarly, the second annular projection 118 forces the uncured rubber hose to follow the contour of the socket forming portion 66 and annular sloped surface 62 (FIG. 6) of the sleeve member 38.

After the end forming cap assembly 18 is fully received on the upper end 30 of the hose 16, the end forming cap assembly 18, hose 16, and mandrel assembly 14 are cured in a conventional autoclave. The autoclave heats the hose to a temperature sufficient to cure it in the contoured shape defined by the mandrel assembly 14 and the end forming cap assembly 18. The hose 16, end forming cap assembly 18, and mandrel assembly are then removed from the autoclave and the end forming cap 18 is removed. Next, the cured hose 16 is removed from the mandrel and then air cooled.

Figure 3:
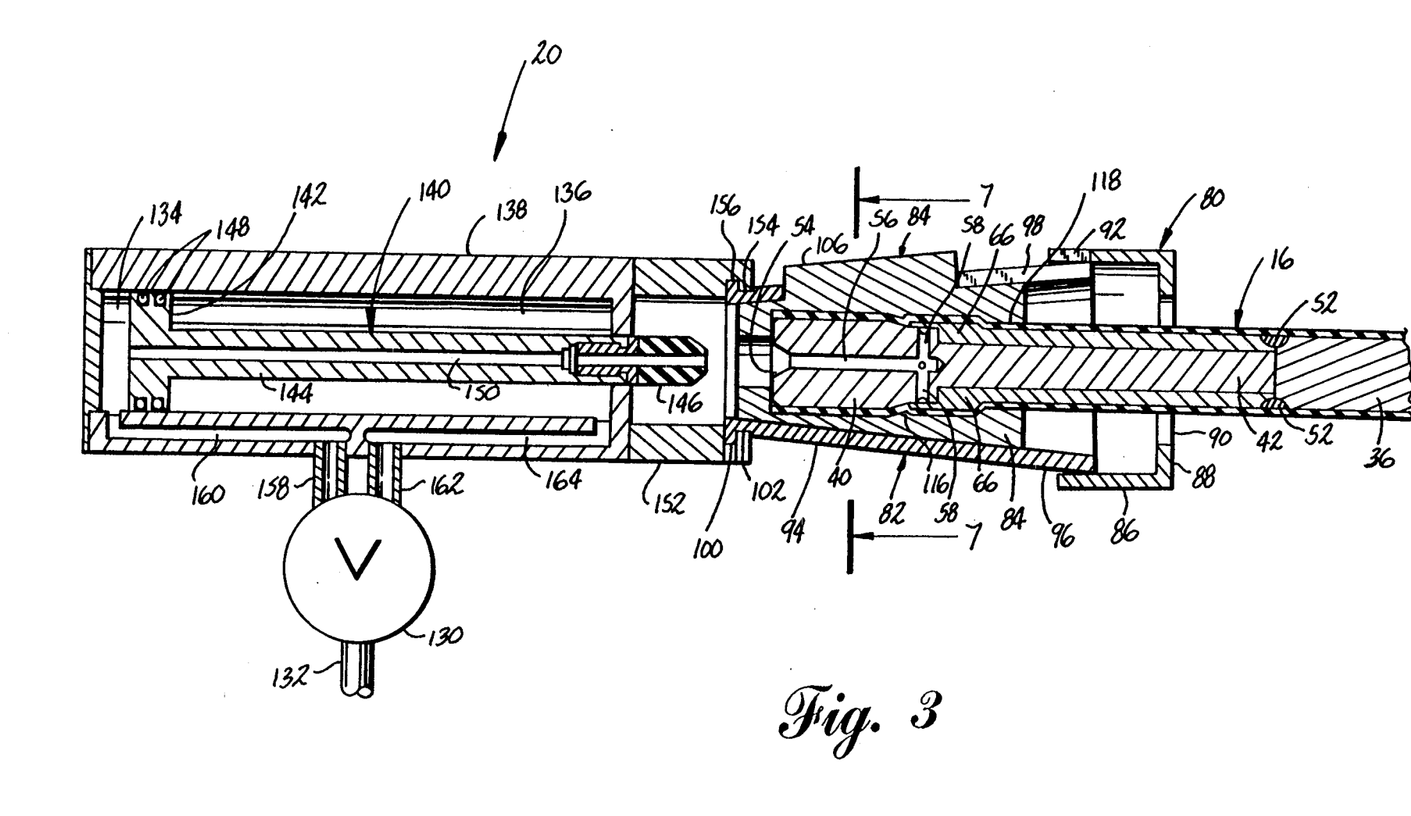
FIG. 3 is a sectional view like FIG. 2 of the air removal tool mounted on the end forming cap assembly following curing of the rubber hose.

As seen in FIG. 3, an air removal tool 20 is used to disengage the end cap forming assembly 18 from the cured rubber hose 16 and the mandrel assembly 14. The air removal tool 20 comprises a valve 130 which is connected to a source of pressurized air (not shown) or other suitable fluid by a conduit 132. The valve 130 selectively supplies pressurized air to a first chamber 134 and a second chamber 136 of an air removal tool housing 138. A piston rod 140 is slidably mounted in the housing 138 and separates the first and second chambers 134, 136. The piston rod member 140 comprises a rear wall 142 separating the first and second chambers 134, 136, a shaft 144 extending forward from the rear wall 142 and an elastomeric tip 146 mounted at the terminal end of the shaft 144. A pair of O-rings 148 are received on the outside perimeter of the rear wall 142 to create an air-tight seal between the first chamber 134 and the second chamber 136. An axial aperture 150 extends through the rear wall 142, shaft 144 and elastomeric tip 146 of the piston rod member 140. The axial aperture 150 is in fluid communication with the first chamber 134.

A mounting member 152 is mounted to one end of the air removal tool housing 138 and is adapted to slide onto the end of the tapered cone 82. To this end, the mounting member 152 has a locking groove 156 bounded by a locking flange 154 to receive the flange 100 of the end cap forming assembly 18. The flange 154 is adapted to be received in a groove 102 of the tapered cone 82. A locking groove 156 is formed in the mounting member 152 and is adapted to receive the end flange 100 of the tapered cone 82. The groove 156 is open at one side so that the flange 100 can freely slide into and out of the groove 156.

Figure 4:
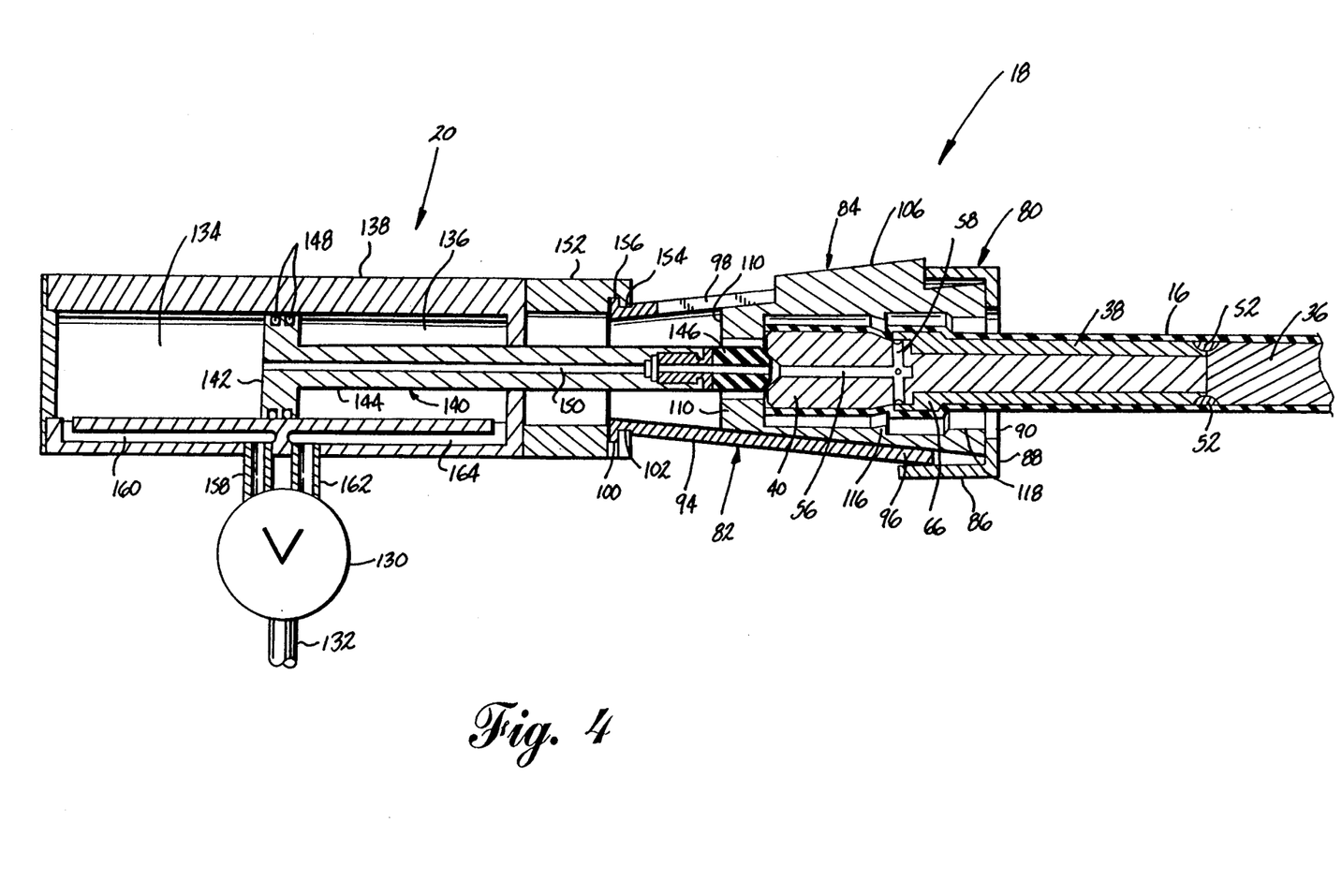
FIG. 4 is a sectional view like FIG. 3 of the air removal tool, end forming cap assembly and socket forming end of the mandrel in an initial stage of removing the end cap forming assembly and cured rubber tubing from the mandrel.

The first step in disengaging the end cap forming assembly 18 from the cured rubber hose 16 is to mount the tool 20 to the cap 18 by sliding the locking groove 156 and locking flange 154 of the mounting member 152 onto the flange 100 and groove 102 of the tapered cone 82. Prior to mounting the tool 20 on the end cap 18, the piston rod member 140 is retracted into the housing 138. Next, pressurized air is supplied from the valve 130 to the first chamber 134 through a second and third conduit 158, 160. The pressurized air displaces the piston rod member 140 within the housing 138 such that the shaft 144 and elastomeric tip 146 extend further and further outwardly from the housing 138. Eventually, as shown in FIG. 4, the elastomeric tip 146 will engage the conical recess 54 of the end forming member 40.

Continued application of pressurized air to the first cylinder 134 causes continued extension of the piston rod member 140 from the housing 138. Because the housing 138 of the air removal tool 20 is locked to the narrow end 94 of the end forming cap assembly 18, the piston rod member 140 moves the end forming cap assembly 18 relative to the mandrel assembly 14. Therefore, as the piston rod member 140 is extended from the housing 138, the retaining cap 80 and tapered cone 82 move relative to the end forming member 40 of the mandrel assembly 14. As seen in FIG. 4, this movement results in the sliding movement of the sleeve members 84 from the closed position as seen in FIG. 3 to the open position as seen in FIG. 4. In moving from the closed to the open position, the sleeve members 84 expand as a function of the tapered construction of the cone 82, thereby disengaging the sleeves 84 from the exterior surface of the reinforced cured hose 16.

Figure 5:
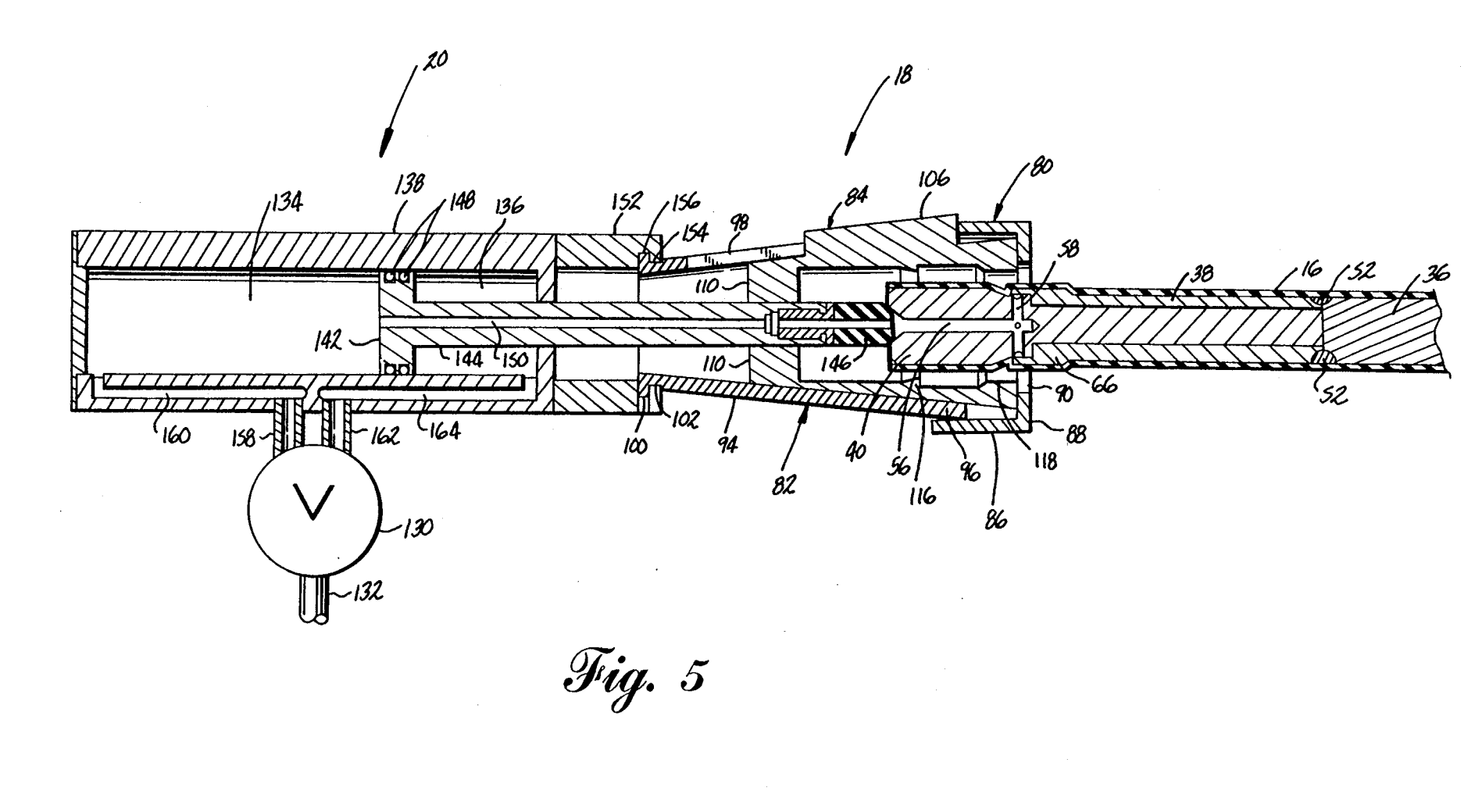
FIG. 5 is a sectional view like FIG. 4 showing a later stage of removing the end cap forming assembly and the cured rubber tubing from the end of the mandrel.

As seen in FIG. 5, continued movement of the piston rod member 140 results in continued separation of the end forming mandrel 40 from the retaining cap assembly 18. Ultimately, the end forming member 40 will be entirely displaced out of the aperture 90 of the retaining cap 80, thereby disengaging the retaining cap assembly 18 from the mandrel assembly 14. Finally, the cured rubber hose 16 is removed from the mandrel assembly and passed on to finishing operations.

The air removal tool 20 also assists in separating the cured rubber hose 16 from the recess 74 of the mandrel assembly 14. As pressurized air is supplied to the first chamber 134, a portion of the pressurized air in the first chamber 134 passes through the axial aperture 150 of the piston rod member 140 and the elastomeric tip 146 and enters the axial passageway 56 of the end forming member 40. From here, the compressed air passes through the radial passageways 58 and ultimately to the annular groove 60 and into the recess 74. As the air enters the annular recess 70, it expands the elastomeric hose radially and provides a thin film of air between the hose 16 and the outer surface of the end forming member 40, thereby assisting in the removal of the cured hose 16 from the mandrel 14. The pressurized air also forces any debris or other foreign material from the groove 60, radial passageways 58 or axial passageway 56 such that this vent system is not clogged for subsequent curing operations.

The piston rod member 140 of the air removal tool 20 is returned from its fully extended position to the retracted starting position as seen in FIG. 3 by changing the direction of flow of pressurized air through the valve 130. In the second position of the valve, pressurized air is no longer supplied to the first chamber 134 which is vented, but is instead supplied to the second chamber 136 through a fourth and fifth conduit 162, 164. The increase in air pressure in the second chamber 136 and release of pressure in the first 134, causes the piston rod member 140 to move rearwardly such that the shaft 144 is again substantially received inside the housing 138. After the rod 140 has been retracted, the air removal tool 20 can be removed from the end forming cap assembly 18 by sliding the air removal tool laterally relative to the end forming cap assembly 18 to disengage the end flange 100 from the locking groove 156 and the groove 102 of the end cap 94 from the locking flange 154 of the air removal tool 20.

Preferably, a plurality of mandrel assemblies 14 are mounted to a rack 22 as seen in FIG. 1 for mass production of cured products according to the invention. In production, a worker mounts the cap assemblies 18 on the upper ends 30 of the uncured rubber hose 16 and then places the rack 22 with the several mandrel assemblies 14 and retaining caps 18 mounted thereon into the conventional autoclave. After proper curing, the rack 22 is removed from the autoclave and a single worker with one hand-held air removal tool 20 can remove the end forming cap assemblies 18 one by one from the several mandrel assemblies 14 on the rack 22.

In one example of the process for producing a hose according to the invention, an uncured nylon braid reinforced nitrile rubber hose was mounted on a mandrel. The end cap forming assembly was mounted thereon and the assembly was cured for 20 minutes at a temperature of 330° F. with a steam pressure of 115 pounds. The curing temperature and steam pressure are determined as a function of the product to be cured and the curing temperature.

Figure 8:
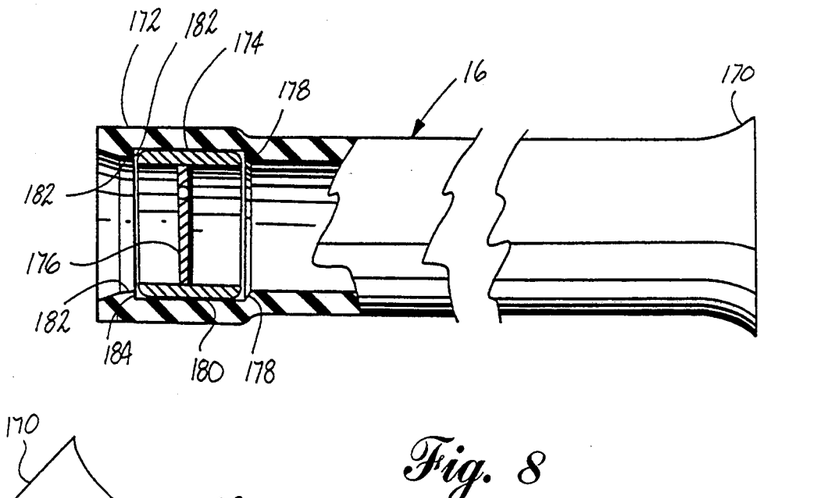
FIG. 8 is an elevational view of a length of cured rubber hose partially broken away to show an anti-splashback valve mounted in the socket formed according to the invention.

The product produced according to this invention comprises a cured rubber hose 16 having an internal socket or other contoured configuration formed therein. Preferably, the hose is reinforced with a conventional metal or fabric reinforcing material 34 (FIG. 6). As seen in FIG. 8, the hose 16 has a flared end 170 and a contoured end 172 having an internal socket 174 formed therein. In the embodiment seen in FIG. 8, the internal socket 174 is ideally suited for receiving a conventional anti-splashback valve 176. The valve 176 is press-fit into the open, contoured end 172 of the hose 16.

The socket 174 comprises a leading edge 178, a body receiving portion 180 and a locking annular flange 182 having a ramped leading conical surface terminating in a radial outwardly extending locking edge 184. The body receiving portion of 180 of the socket 174 is dimensioned to tightly receive the anti-splashback valve 176. The inwardly projecting leading edge 178 and the inwardly projecting locking annular flange 182 prevent movement of the anti-splashback valve 176 within the hose 16.

The leading conical surface of the annular flange 182 assists in guiding the valve 176 to the seated position shown in FIG. 8. In light of the resiliency of the reinforced elastomeric material comprising the hose 16, the locking annular flange 182 can be deflected outwardly such that the anti-splashback valve 176 can be inserted into the internal socket 174. However, the inwardly extending leading edge 178 and locking edge 184 of the locking annular flange 182 will prevent removal of the anti-splashback valve 176 from the hose 16.

Figure 9:
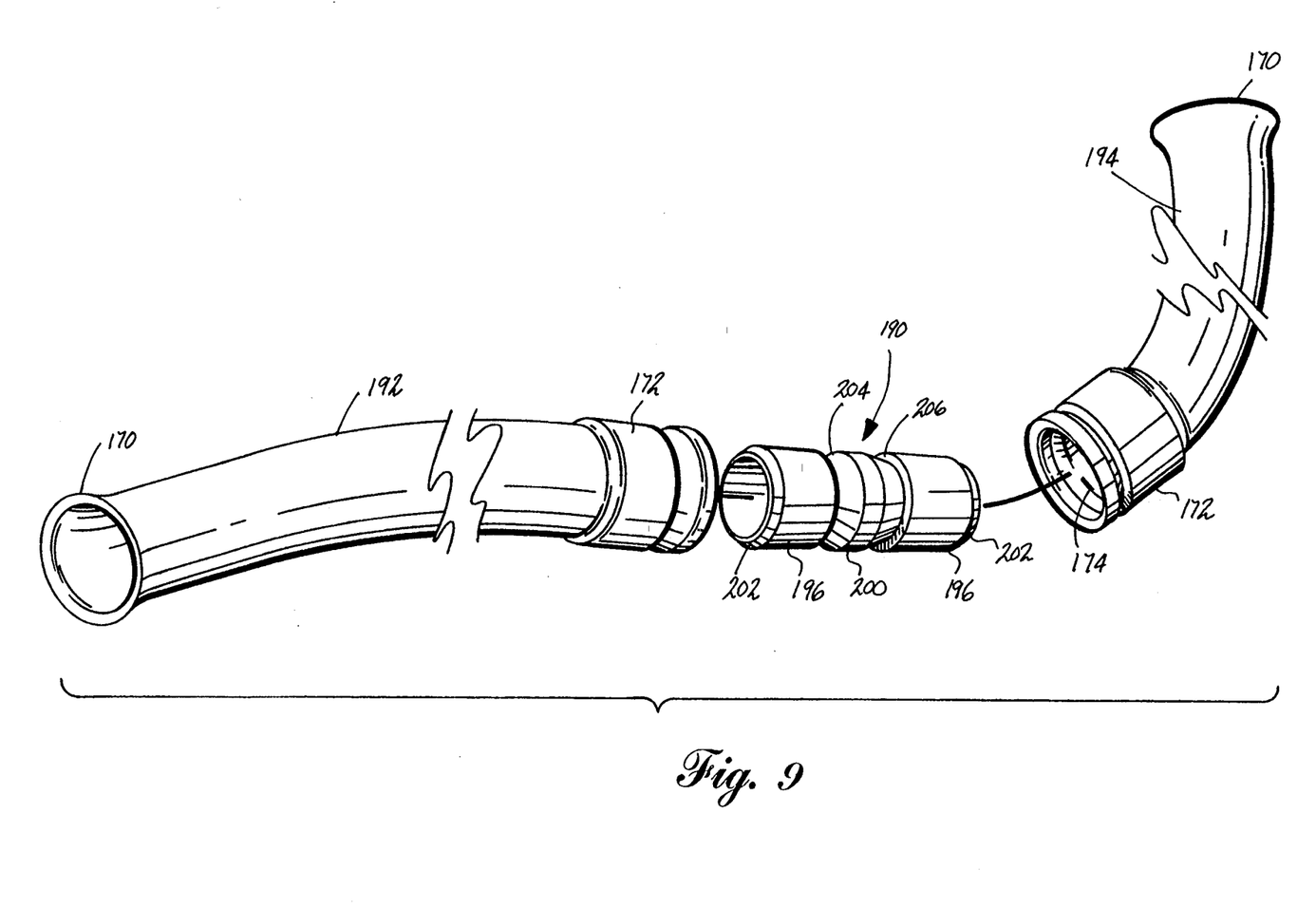
FIG. 9 is an exploded view of two lengths of cured, rubber hose having internal sockets formed therein according to the invention and a connector used to interconnect the two socket ends of the rubber hose according to the invention.
Figure 10:
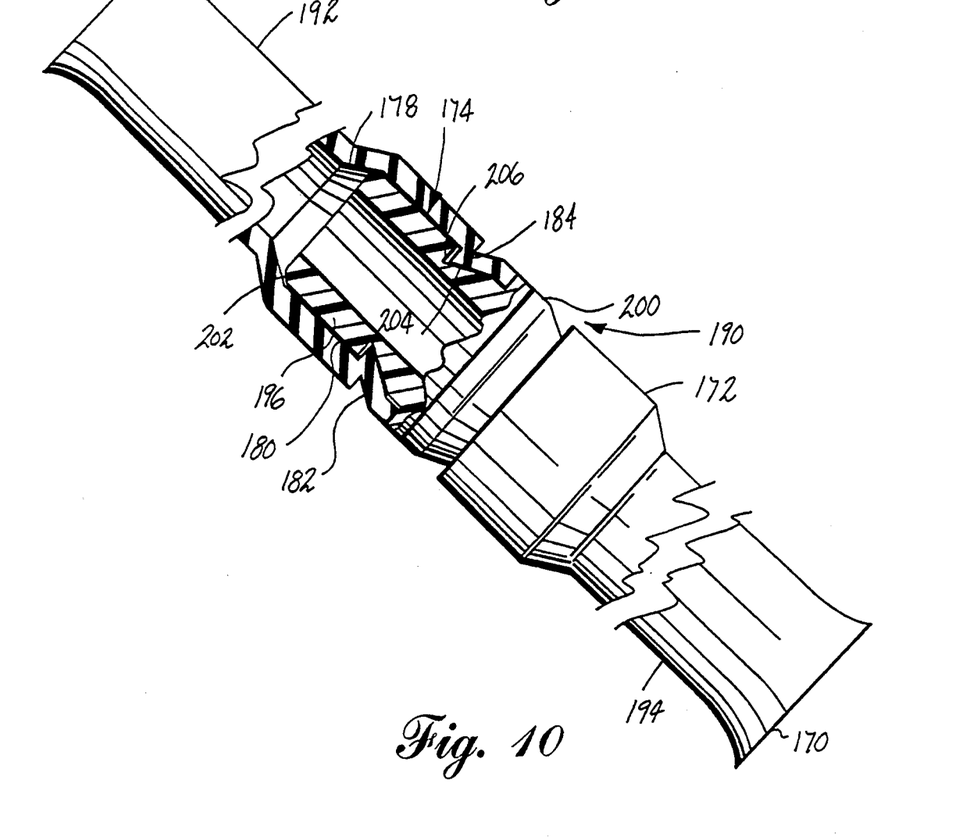
FIG. 10 is an elevational view, partially in section, of an assembly joint formed by the hoses and connector of FIG. 9.

A second embodiment of the cured rubber hose product produced according to the invention is seen in FIGS. 9 and 10. These figures depict a connector 190 which can be used to interconnect two hoses 192, 194 wherein the two hoses 192, 194 have formed therein an internal socket of a shape identical to the contoured end 172 of hose 16 and adapted to receive the connector 190. In this embodiment, the connector 190 comprises a molded thermoplastic member having a pair of outwardly extending bosses 196, 198 and a central portion 200 disposed between the two bosses 196, 198. Each of the bosses has a tapered leading edge and an annular groove 204. The socket 174 receives the boss 192 such that the tapered leading edge 202 of the boss 192 is adjacent the leading edge 178 of the socket 174. Similarly, the annular groove 204 is adapted to receive the locking annular flange 182 of the socket 174. The locking edge 184 of the flange 182 abuts a locking edge 206 of the annular groove 204 of the connector boss 196.

By the formation of an internal socket in a cured, reinforced rubber hose according to the invention, a pair of hoses can be mounted to one another with the use of a simple, molded thermoplastic connector 190. With this configuration, hose clamps or other securing means are not needed to securely mount the ends of the hoses 192, 194 to the connector 190. The strength of the reinforced hose and the internal contoured configuration of the socket provides sufficient strength for connecting two hoses to one another for a wide variety of applications, such as hoses for use in automotive coolant systems. The elimination of additional securing means such as hose clamps will simplify the structure of assembling two hoses together and also will reduce the cost of this assembly.

The ability to create a contoured internal surface for a cured rubber hose, according to the invention, has numerous other applications, such as the mounting of an anti-splashback valve as described above. It will be obvious to a person skilled in the art that numerous other internal configurations can be formed on the interior surface of the hose. For example, a plurality of internally extending barbs can be formed on the interior surface of the hose according to the invention.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments for which an exclusive property or privilege is claimed are defined as follows:

1. A cured thermosetting elastomeric hose comprising:
   a body portion having an interior surface with an internal diameter;
   an end portion having an interior surface;
   a socket portion having an interior surface with an internal diameter, the socket portion being formed intermediate the end and body portions and the socket portion internal diameter being greater than the body portion internal diameter;
   an internal surface formed between the interior surface of the socket portion and the interior surface of the body portion;
   a retaining surface extending radially inwardly between the interior surface of the socket portion and the interior surface of the end portion; and
   a conical guiding ramp surface in the end portion extending radially inwardly and axially toward the socket portion and terminating at the retaining surface;
   wherein the retaining surface is adapted to retain within the socket portion a member having an external diameter substantially the same as the diameter of the internal surface of the socket portion.

2. A cured elastomeric hose according to claim 1 wherein the elastomeric hose comprises a thermosetting rubber hose.

3. A cured elastomeric hose according to claim 2 and further comprising reinforcing material integrally molded into the elastomeric hose.

4. A cured elastomeric hose according to claim 3 wherein the reinforcing material is selected from the group comprising steel, nylon and Kevlar.

5. A cured elastomeric hose according to claim 3 wherein the rubber hose comprises a nylon braid reinforced nitrile rubber hose.

6. A cured elastomeric hose according to claim 1 and further comprising an anti-splashback valve mounted in the socket portion.

7. A cured elastomeric hose according to claim 1 wherein the retaining surface and the conical guiding ramp surface of the hose are adapted to be received in a complementary groove of the member mounted in the socket.

8. A cured elastomeric hose according to claim 1 and further comprising a connection member selectively mounted in the socket portion, the connection member being adapted to interlock two ends of two elastomeric hoses to one another, in tandem.

* * * * *